United States Patent [19]

Gelsomini et al.

[11] Patent Number: 4,828,778
[45] Date of Patent: May 9, 1989

[54] METHOD FOR CONTINUOUS INJECTION MOLDING

[75] Inventors: Lawrence J. Gelsomini; William R. Mueller, both of Enfield, Conn.

[73] Assignee: Monsanto Company, St. Louis, Mo.

[21] Appl. No.: 738,804

[22] Filed: May 29, 1985

[51] Int. Cl.⁴ .............................................. B29C 45/04
[52] U.S. Cl. ............................ 264/167; 264/216; 264/297.3; 264/328.8; 264/328.11; 425/224
[58] Field of Search .............. 264/167, 175, 284, 216, 264/164, 166, 297.2, 297.3, 328.8, 328.11, 328.16, 331.17, 331.19; 425/224

[56] References Cited

U.S. PATENT DOCUMENTS 3,089,191  5/1963  Conrad ........................... 425/367 X
3,590,109  6/1971  Doleman et al. ............... 425/224 X
3,752,619  8/1973  Menzin et al. ................... 425/573 X
3,956,056  5/1976  Boguslawski et al. ......... 425/224 X
4,145,173  3/1979  Pelzer et al. ....................... 425/224

*Primary Examiner*—Jan H. Silbauch
*Assistant Examiner*—Leo B. Tentoni
*Attorney, Agent, or Firm*—John W. Whisler

[57] ABSTRACT

A method for continuous injection molding of thermoplastic materiall into three-dimensional sheets having a projection extending from a substantially uniform backing layer. An extrusion die having a face matching the surface of a rotatable mold drum with cavities therein provides molten thermoplastic material simultaneously into the cavities to form the projections and onto the surface to form the backing layer.

3 Claims, 3 Drawing Sheets

METHOD FOR CONTINUOUS INJECTION MOLDING

BACKGROUND OF THE INVENTION

This invention relates to apparatus and methods for continuous injection molding of three-dimensional sheets of thermoplastic material. More specifically a slotted extrusion die is utilized to provide thermoplastic material at a high pressure for injection into cavities in the periphery of a rotating drum mold and simultaneously to provide a substantially uniform backing from which projections extend from one side to provide a three-dimensional layer.

Continuous injection molding apparatus and processes are known in the art. Doleman, et al. disclose such apparatus and processes in U.S. Pat. No. 3,590,109. In such disclosure an extrusion die supplies polymer to rotating molds into pressure zones, i.e. a high pressure zone to allow injection of polymer to the extreme depth of mold cavities in the rotating mold and a low pressure zone to provide polymer in a controlled manner to a surface layer on the rotating mold. Such apparatus requires precisely machined interacting surfaces between the rotating mold and the extruded nozzles, including combinations of lands and grooves to provide three-dimensional sheets having backing layers of parallel rows of ribs between, and interconnecting, parallel rows of projections from one side thereof. Because such backing layers are of such non-uniform geometry, there is generally considerable residual stress in such three-dimensional sheets which makes them not altogether desirable for some otherwise advantageous uses, e.g. in laminates which undergo flexing, such as spray suppression devices.

Moreover such apparatus and methods, as disclosed by Doleman, et al., have the further disadvantage of the need for precise machining of interacting surfaces between the rotating mold and the extrusion die and the requirement for extruding thermoplastic material into separate pressure zones.

Related apparatus and methods are disclosed by Menzin, et al. in U.S. Pat. No. 3,752,619. Such apparatus and methods are similarly disadvantageous in that high and low pressure application of polymer is required to produce three-dimensional sheets.

By this invention applicant has provided apparatus and methods for continuous injection molding of thermoplastic material into a three-dimensional layer which overcomes the aforementioned deficiencies of the prior art.

Accordingly, a principle object of this invention is to provide apparatus and method for continuous injection molding of three-dimensional layers utilizing an extrusion die which can provide polymer at high pressure for injection into cavities and simultaneously providing a backing layer of uniform geometry without uncontrolled flow of polymer in this region of the backing layer.

Another object of this invention is to provide apparatus and methods for continuous injection molding of thermoplastic material into a grass-like three-dimensional layer having blade-like projections extending from one surface of a substantially flat sheet where the three-dimensional layer has substantially low residual stress.

These and other objects of the invention are accomplished by providing apparatus and methods for continuous injection molding comprising a rotatable mold drum having a plurality of cavities extending below a substantially smooth peripheral surface and an extrusion die cooperating with the drum to form an extrusion nozzle therebetween. The cavities have discrete dimensions in the direction of rotation of the drum. The extrusion die has at least one centrally located port for admitting thermoplastic material to the surface of the drum.

The apparatus is arranged so that the substantially flat sheet comprising the backing of the three-dimensional layer is formed and sized in the extrusion nozzle formed between an extrusion face of the die and the rotating mold drum. The extrusion face extends generally parallel to the surface of the drum from at least one port generally centrally located in the die to admit polymer under pressure to the surface of the drum. The extrusion face extends from the at least one port in the direction of rotation of the drum for a distance greater than the discrete dimensions of the cavities; this distance is sufficient that the thickness of a polymer sheet exiting from the extrusion nozzle is substantially the same thickness as the minimum thickness of the nozzle.

Such apparatus is operated so that the extrusion nozzle is smaller than the gap between the other margins around the port and the drum. Surprisingly, such extrusion nozzles provides a seal between the die and the rotating drum to maintain thermoplastic material at high pressure for injection into cavities without allowing the extrusion of thermoplastic material out of the larger gaps between the other larger gaps and the rotating drum.

In preferred embodiments the extrusion die has an arcuate surface matching the radius of the surface of the drum. In other preferred embodiments the at least one port is a channel parallel to the axis of rotation of the drum. The margins around such slot have surface dimensions no less than such discrete dimensions of the cavities to assist in providing a seal for maintaining thermoplastic material under high pressure for injection into the extremities of the cavities.

In preferred embodiments the rotating drum has cooling means to remove thermal energy from thermoplastic material extruded onto the surface and into cavities within the mold drum.

In other preferred embodiments the cavities present a circular opening in the surface of the mold drum and allow for molding of cup shapes on one surface of a substantially flat sheet with a plurality of blade-like elements extending from the ends of the cup shapes.

The apparatus and methods of this invention are useful in the continuous injection molding of three-dimensional layers with projections extending from one surface thereof. Such apparatus and methods are especially useful in the continuous injection molding of a grass-like three-dimensional layer of thermoplastic material having a plurality of elongated blades extending from a substantially flat sheet. Moreover, by the apparatus and methods of this invention such grass-like three-dimensional layers can be produced which have low residual stress, an advantageous property for many applications where such three-dimensional layers undergo flexing, e.g. in spray-suppression devices where grass-like three-dimensional layers are laminated to a substantially rigid backing layer. Moreover, the apparatus and process of this invention can be advantageously combined with laminating methods to apply a sheet of thermoplastic material to the backing surface of three-dimensional layers being formed on the mold drum.

DETAILED DESCRIPTION OF THE INVENTION

Throughout this specification, percentages of compositions are by weight and temperatures are in degrees Celsius unless indicated otherwise.

Figure 1:
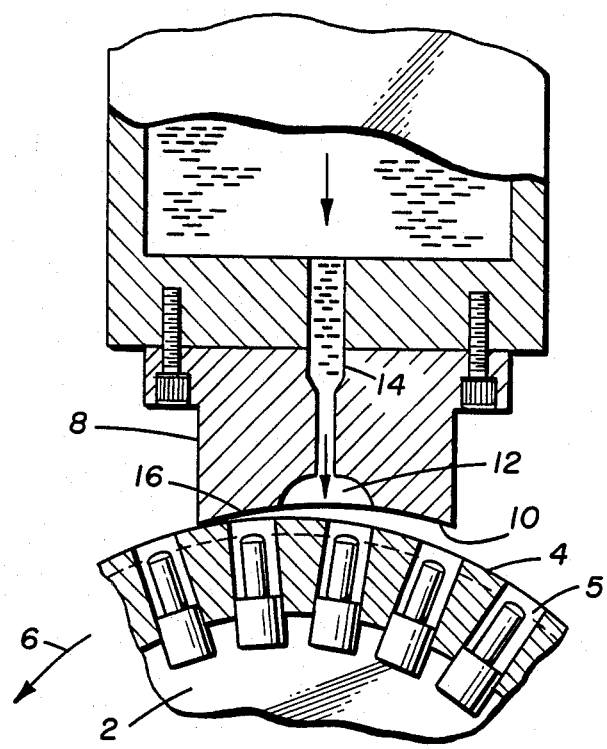
FIG. 1 is a partial cross-sectional illustration of apparatus according to the invention comprising a rotating mold drum and polymer extrusion die.

With reference to FIG. 1 there is shown the general arrangement of one embodiment of apparatus preferred for practicing the invention where a mold drum 2 (shown in partial cross-sectional view) rotates in the direction indicated by the arrow 6. The peripheral surface 4 of the drum mold contains a plurality of cavities 5 for forming a three-dimensional layer. Extrusion die 8 cooperates with mold drum 2 and has a peripheral surface generally matching the peripheral surface 4 of the mold drum. Between a leading margin 10 and trailing margin 16 of the peripheral surface of the extrusion die there is a slot 12 transverse to the direction of rotation of the mold drum. Port 14 serves to provide molten thermoplastic material from an extrusion source to slot 12. Trailing margin 16 serves as an extrusion face. The gap between trailing margin 16 and the surface 4 of the mold drum provides an extrusion nozzle and is smaller than the gap between leading margin 10 and the surface of the mold drum.

In some cases it is convenient for the peripheral surface of the extrusion die to be arcuate and of a radius that is the same or nearly the same as the radius of the peripheral surface of the mold drum. In other cases it is satisfactory for the peripheral surface of the extrusion die to be generally parallel to the surface of the drum.

The gap between trailing margin 16 and the surface 4 of the mold drum can be adjusted depending on the thickness of the sheet desired to be formed by the extrusion nozzle formed therebetween. In many cases a gap in the range of from 0.1 to 0.6 mm (0.004 to 0.024 inches) is desired. Another variable is the cross-section and length of projections forming the three-dimensional layer. At a fixed mass flow rate of thermoplastic material, the thickness of the backing formed by the extrusion nozzle will be inversely proportional to the length of the projection for any mold cavity dimension. When making grass-like, three-dimensional layers having blades about 19 mm (0.75 inches) long, it is generally practical and useful to have the nozzle provide a backing about 0.4 mm (0.016 inches) in thickness.

The gap between the leading margin and the peripheral surface of the mold drum should generally be at least 0.08 mm (0.003 inches), or more, greater than the gap forming the extrusion nozzle.

The gap between side margins and the peripheral surface of the mold drum will usually be variable as a transition between the larger gap at the leading margin and the smaller gap at the trailing margin.

Figure 2:
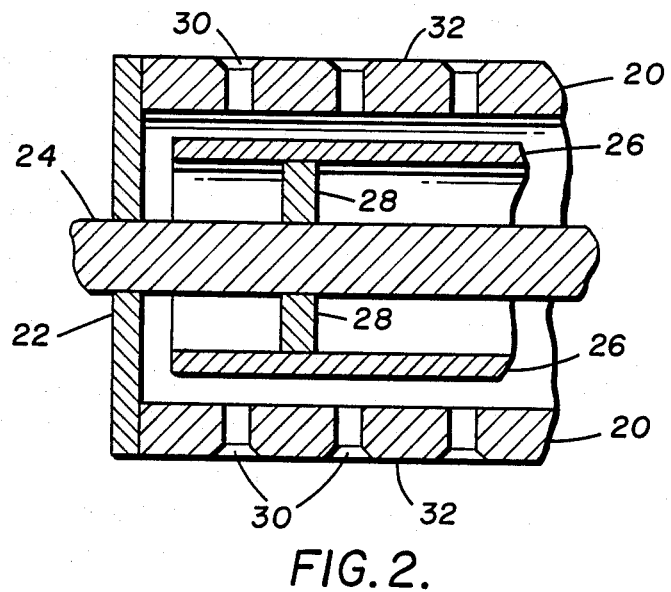
FIG. 2 is a partial cross-sectional view of a typical mold drum.
Figure 3A:
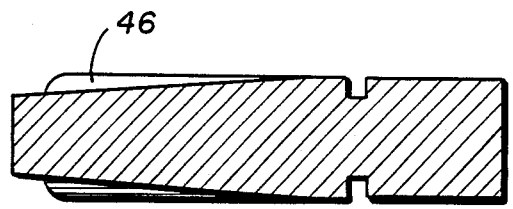
FIGS. 3a and 3b are cross-sectional views of a mold cavity insert pin useful in the continuous injection molding of grass-like three-dimensional layers.
Figure 3B:
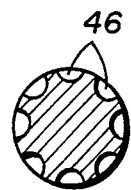
Figure 4:
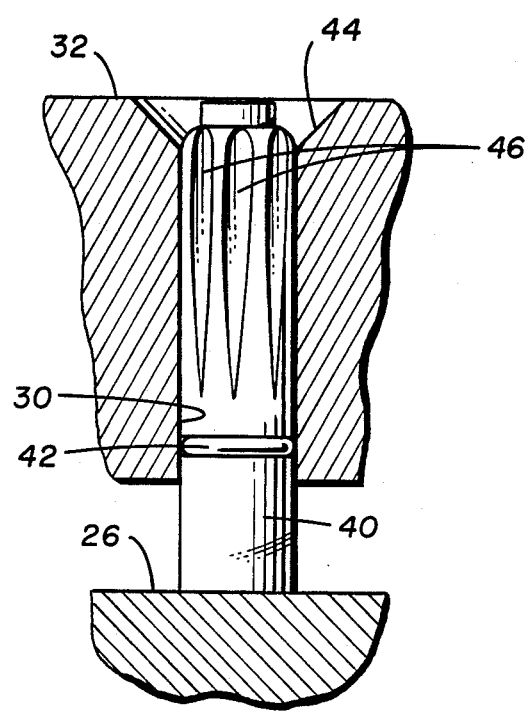
FIG. 4 is a partial cross-sectional view of an assembly of an insert pin in a mold drum cavity.

FIG. 2 is a partial cross-sectional representation of a typical mold drum formed of an outer shell 20 attached by head 22 to a central journal 24. Inner shell 26 is supported by braces 28 to the journal 24. A plurality of cavities 30 are located in outer shell 20. Open spaces between the outer inner shells and journal provide passages for directing cooling medium to facilitate solidification of thermoplastic material molded on the drum. Such drums can be constructed of a variety of materials. Generally steel is an acceptable material of construction for the mold drum; the outer surface 32 which contacts the thermoplastic material and is often polished, hardened and optionally treated to facilitate polymer release, e.g. with a fluorocarbon treatment. The cavities 30 should be closed off or plugged by means (not shown) to prevent intermixing of thermoplastic material injected into the cavity and the cooling fluid generally located below the surface of the drum. The shape of cavities 30 can vary depending on the desired three-dimensional shape required. Cavities can be prepared to provide circular, square, cross-shaped or other such projections which may be either hollow or solid. In a particularly preferred apparatus the cavity will be filled with a pin as illustrated in FIGS. 3a and 3b to provide grass-like surface with blades of thermoplastic material extending from a cup-like base. The cooperation of such a pin with a cavity is illustrated in FIG. 4 where a pin 40 is located within cavity 30 such that the base of pin 40 rests on inner drum 26 and an O-ring type seal 42 is used to restrain the outward flow of cooling fluid through the cavity. The chamfered edge 44 of cavity 30 assists in providing a transitional surface from the blade-like elements formed in slots 46 to the backing of the three-dimensional layer which forms on surface 32 of the mold drum. Such pins can be fabricated from a variety of materials. Softer metals, such as brass, have been found to be particularly advantageous materials in construction for such cavity filler pins.

Figure 5A:
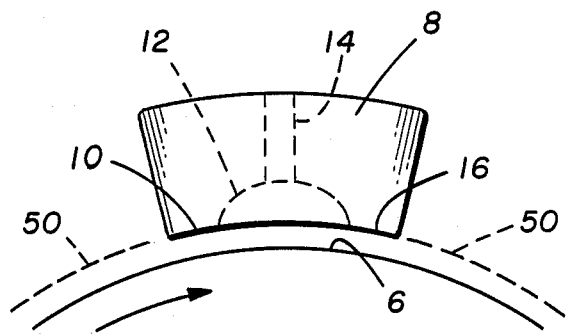
FIGS. 5a and 5b illustrate the cooperation of one extrusion die and a rotating drum mold according to the apparatus and process of this invention.
Figure 5B:
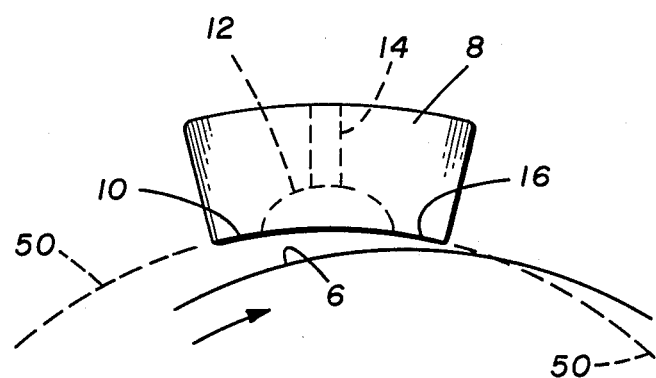

FIGS. 5a and 5b schematically illustrate the cooperation of a preferred extrusion die and the rotating mold drum in the apparatus and methods of this invention. Such extrusion die has a peripheral surface which is arcuate and of the same, or nearly the same, radius as the surface of the mold drum. Dotted line 50 represents an extension of the arcuate plane of the margins of the surface of extrusion die 8 which is matching with the peripheral surface 6 of the rotating mold drum. In FIG. 5a the centers of the radius of curvature of the extrusion die surface and the mold drum surface are merely displaced vertically with respect to each other so that the gap between leading margin 10 and the mold drum is the same as the gap between trailing margin 16 and the mold drum. In the apparatus and methods for continuous injection molding according to this invention such centers of radius curvatures are also displaced horizontally with respect to each other; for instance, the mold drum can be moved transversely with respect to the extrusion nozzle such that the gap between trailing surface 16 and the mold drum which forms an extrusion nozzle is smaller than the gap between leading margin 10 and the mold drum.

When starting up the continuous injection molding apparatus of this invention it is useful to have an alignment of the extrusion die and the mold drum as indicated in FIG. 5b. However, the mold drum and extrusion die are substantially separated vertically as thermoplastic material is made to flow through port 14 to transverse slot 12. With the mold drum rotating, the extrusion die and mold drum are brought into proximity. As the trailing margin approaches the rotating drum to ride on a thin layer of polymer backing, the polymer initially extrudes profusely through the gaps between the side margins of the extrusion die and the drum periphery. Then, surprisingly, as the front margin of the extrusion die gets closer to the peripheral surface of the mold drum riding on an even thinner layer of polymer, the polymer extrusion through the side margin is diminished; and in many cases, e.g., when polymer mass flow rates and extrusion die margins are properly adjusted, such polymer extrusion stops entirely. Operation of continuous injection molding processes with the extrusion die canted with respect to the mold drum as shown in FIG. 5b substantially reduces the potential for galling the surfaces of the mold drum by accidental metal contact e.g. by the leading surface of the die.

Surprisingly, polymer injected at high pressures, e.g. on the order of about 7000 kPa (about 1000 psig), does not extrude out the much wider gap between the leading margin 10 and the mold drum nor through the generally tapered gap between the side margins and the mold drum. Still further surprisingly a thin layer of thermoplastic material is extruded through the nozzle provided by the trailing margin 16 and the mold drum. Moreover, operation of continuous injection molding with such an oriented extrusion die provides adequate seal around the slot 12 to maintain high pressures of thermoplastic material to allow injection of the molten thermoplastic material into the extremities of cavities in the surface of the mold drum. In this regard it is believed that the rotation of the mold drum carries polymer material into the extrusion nozzle, thereby generating pressure which assists in forcing polymer into the mold cavities.

The apparatus and process of this invention are useful in the continuous injection molding of three-dimensional layers comprising a variety of thermoplastic materials including polyolefins such as polyethylene and polypropylene, polyvinylhalides such as polyvinylchloride, polyvinylesters such as polyvinylacetate, styrene homopolymers and copolymers such as acrylonitrile butadiene styrene copolymers, acrylics, such as polymethylmethacrylate, polycarbonates, polyamides such as nylons and blends or copolymers of the foregoing or other thermoplastic materials. Preferred thermoplastic materials for such continuous injection molding of three-dimensional layers include polyolefins and polyamides. Preferred polyolefins include high density polyethylene, low density polyethylene and linear low density polyethylene.

The following example is given to illustrate a preferred apparatus and process of applicant's invention which is also merely illustrative of the wide variety of apparatus, methods and products that may be obtained by following the teachings of this invention.

EXAMPLE 1

This example illustrates a preferred apparatus and method for continuous injection molding of the grass-like three-dimensional layer suitable for use as artificial turf or as a facing for spray-suppression devices.

The rotating drum mold was prepared as generally illustrated in FIGS. 1 through 5, previously described. The drum mold has a nominal diameter of 50.8 cm (20 inches) at its outside surface which was nominally 127 cm (50 inches) long. The outer surface was prepared with a plurality of parallel rows of borings chamfered at the surface around the periphery of the drum. Brass pins as illustrated in FIGS. 3a and 3b having eith tapered slots machined into the peripheral surface were inserted into the borings to provide cavities as generally illustrated in FIG. 4. Such a mold drum is capable of producing a grass-like three-dimensional layer.

An extrusion die was prepared having an arcuate surface following a 25.4 cm (10 inch) radius which matched the periphery of the mold drum. A somewhat semi-circular transverse slot was located within leading, trailing and side margins in the arcuate surface of the die. The mold drum and die were oriented as generally shown in FIG. 5b such that the trailing margin of the die was located closer to the surface of the mold drum than the leading margin of the die.

A composition of low density polyethylene (LDPE) was prepared for extrusion at high temperature and pressure through the transverse slot of the die onto the mold drum. The LDPE composition comprised 99.2 percent LDPE having a density specified to be in the range from 0.915 to 0.92 (determined by ASTM-D 792) and a melt index specified to be in the range of 18 to 24 (determined by ASTM-D 1238). The composition also contained adjuvants not considered critical to the process of the invention including UV stabilizer, colorants, slip agent and antioxidant. The LDPE composition was processed by conventional means and supplied through the extrusion die to the surface of the mold drum at a temperature of 204° C. (400° F.) and a pressure of about 7000 kPa (about 1000 psig). The mold drum was rotated at about 0.75 rpm and was maintained at a temperature of about 18° C. (65° F.) through circulation of high volumes of water through the passages within the drum.

As the drum rotated beyond the edge of the extrusion nozzle there was provided a thin layer of thermoplastic material which provided a backing from which a grass-like three-dimensional surface was formed within the cavities of the mold. As the mold drum rotated the thermoplastic material solidified and the blade-like elements were extracted from the mold drum by tension applied along the length of the layer. The grass-like three-dimensional layer comprised a plurality of rows of cup-like bases having a nominal diameter of 8 mm (0.32 inches) and having eight blade-like elements extending from the edge thereof. The blade-like elements extended about three-quarters of an inch from the surface of a substantially flat backing having a nominal thickness of 0.4 mm (0.016 inches).

Such grass-like three-dimensional layer could be utilized as artificial turf, or as a spray-suppression surface when laminated to a more rigid backing of thermoplastic material.

The preceding description is set forth for purposes of illustration only and is not to be taken in a limited sense. Various modifications and alterations will be readily suggested to persons skilled in the art. It is intended, therefore, that the foregoing be considered as exemplary and that the scope of the invention as ascertained from the following claims.

What is claimed is:

1. A method for producing continuous lengths of three-dimensional molded products by an injection molding process which comprises:

(a) continuously feeding a molten thermoplastic material to a slot in an arcuate face of an extrusion die positioned proximate to a rotating arcuate mold surface having a plurality of cavities therein;

(b) providing sufficient pressure upon said thermoplastic material to inject the material into the extremities of said cavities;

(c) maintaining the arcuate face of said extrusion die such that a leading gap between said drum and a leading margin on the surface of said extrusion die adjacent to said slot is greater than a trailing gap between said drum and a trailing margin on the surface of said extrusion die adjacent said slot; and wherein a substantially flat sheet comprising a backing for said three-dimensional molded product is extruded between said trailing margin and the drum, said backing interconnecting the thermoplastic material injected into said cavities whereby a three-dimensional product having projections extending from one side of a substantially flat surface is formed;

(d) cooling the product until solidification is completed; and (e) removing the solidified three-dimensional product from the mold surface.

2. The method of claim 1 wherein the thermoplastic material is provided at an injected pressure within said slot at a pressure exceeding 500 psig.

3. The method of claim 2 wherein the thermoplastic material is selected from the group consisting of polyethylene, polypropylene, and polyamides.

* * * * *